United States Patent [19]
Wilhite

[11] Patent Number: 6,161,174
[45] Date of Patent: Dec. 12, 2000

[54] PIPELINED CENTRAL PROCESSOR INCORPORATING INDICATOR BUSY SENSING AND RESPONSIVE PIPELINE TIMING MODIFICATION

[76] Inventor: John E. Wilhite, 8225 N. 45th Ave., Glendale, Ariz. 85302

[21] Appl. No.: 09/187,123

[22] Filed: Nov. 5, 1998

[51] Int. Cl.[7] .............................. G06F 9/318; G06F 9/38
[52] U.S. Cl. ......................... 712/226; 712/218; 712/235
[58] Field of Search ..................................... 712/208, 238, 712/219, 234, 218, 216, 23, 217, 226, 235, 236

[56] References Cited

U.S. PATENT DOCUMENTS

| | | | |
|---|---|---|---|
| 4,903,196 | 2/1990 | Pomerene et al. | 712/217 |
| 5,442,756 | 8/1995 | Grochowski et al. | 712/238 |
| 5,490,255 | 2/1996 | Rawlinson et al. | 712/219 |
| 5,666,507 | 9/1997 | Flora | 712/218 |
| 5,748,935 | 5/1998 | Tremblay et al. | 712/216 |
| 5,796,997 | 8/1998 | Lesartre et al. | 712/234 |
| 5,799,180 | 8/1998 | Shiell et al. | 712/234 |
| 5,809,271 | 9/1998 | Colwell et al. | 712/208 |
| 5,828,895 | 10/1998 | Chan et al. | 712/23 |
| 5,964,868 | 10/1999 | Gochman et al. | 712/234 |

*Primary Examiner*—Meng-Ai T. An
*Assistant Examiner*—J. Chang
*Attorney, Agent, or Firm*—B. E. Hayden; J. H. Phillips; J. S. Solakian

[57] ABSTRACT

A pipelined processor for simultaneously performs one of a plurality of successive operations on each of a plurality of successive instructions within the pipeline, the successive operations including at least an instruction fetch stage, an operand address stage, an operand fetch stage, an execution stage and a result handling stage. The processor also maintains a plurality of indicators which are selectively updated during the result handling stage for a given instruction to reflect the results obtained during the execution stage thereof. When the second instruction of first and second successively fetched instructions is a conditional transfer, a determination is made as to which indicators may be affected by the execution of the first instruction, and a determination is also made as to which indicator the conditional transfer is to test to decide whether there is a GO or a NOGO condition. If the indicator to be tested by the conditional transfer instruction is among those which may be affected by the immediately preceding instruction, the conditional transfer instruction is held at a predetermined stage, for example, in operand addressing, in the pipeline for a predetermined period, such as one full clock cycle, to permit the indicator to be tested to settle before the conditional transfer instruction tests it.

16 Claims, 6 Drawing Sheets

PIPELINED CENTRAL PROCESSOR INCORPORATING INDICATOR BUSY SENSING AND RESPONSIVE PIPELINE TIMING MODIFICATION

FIELD OF THE INVENTION

This invention relates to pipelined computer central processors and, more particularly, to the handling, to avoid a logic race condition, of successive instructions in the pipeline, a first instruction of which establishes a result which may set a flag which must by tested by the second, conditional transfer, instruction to determine a GO/NOGO for the identified transfer.

BACKGROUND OF THE INVENTION

As faster operation of computers has been sought, numerous hardware/firmware features have been employed to achieve that purpose. One widely incorporated feature directed to increasing the speed of operation is pipelining in which the various stages of execution of a series of consecutive machine level instructions are undertaken simultaneously. Thus, in a simple example, during a given time increment, a first stage of a fourth (in order of execution) instruction may be carried out while a second stage of a third instruction, a third stage of a second instruction and a fourth stage of a first instruction are all performed simultaneously.

Pipelining dramatically increases the apparent speed of operation of a computer system. However, there are instances in which conflicts or problems arise among the sequential instructions which can cause pipeline breaks or even processor errors which can adversely affect processor performance since the affected instructions must often be retried.

One specific problem which has arisen in the use of pipelined processors relates to an instruction stream in which a conditional transfer (or conditional branch) follows immediately after an instruction the execution of which can affect the condition which might direct the conditional transfer. That is, in a simple example, an instruction to add a specified operand to the present contents of the accumulator register might be followed by a conditional transfer instruction which calls for a transfer of instruction flow if the result of the previous instruction is zero. Since the result is not known until late in the execution sequence of the first instruction, a zero indicator flag cannot be set until that time. Accordingly, the succeeding conditional transfer instruction is itself into the late stages of its execution such that it must test the flag virtually immediately. In many pipelined processors, an indicator flag is both set (if appropriate) and tested in the same clock cycle.

In the past, this fact did not establish an intolerable logic race; a flag could be set early in a clock cycle and accurately tested late in the same clock cycle. However, as the physical size of integrated circuits has been remarkably reduced and the degree of integration accordingly increased, it has been possible to greatly improve the performance of a given processor configuration by merely increasing the clock speed in the more highly integrated versions. On the other hand, it has been found that there is limit to the extent to which the clock rate can be increased before the indicator flag test carried out by a conditional transfer instruction becomes unreliable. Thus, if the clock rate for a given process or configuration is sufficiently increased, numerous faults and retries may be generated and required to the detriment of overall system performance; in effect, an error prone logic race condition has been created.

Yet, it will be apparent to those skilled in the art that there is great value in building on a proven processor configuration and that it consequently would be highly desirable to provide, in a simple, reliable and economic manner, for increasing the clock rate of a pipelined processor configuration without causing a logic race condition associated with the use of conditional transfer instructions.

OBJECTS OF THE INVENTION

It is therefore a broad object of this invention to provide an improved pipelined processor.

It is a more specific object of this invention to provide an improved pipelined processor which employs an established processor configuration and which avoids a logic race when a conditional transfer instruction immediately follows in the pipeline an instruction which sets the flag tested by the conditional transfer instruction to determine GO/NOGO.

SUMMARY OF THE INVENTION

Briefly, these and other objects of the invention are achieved in a pipelined processor for simultaneously performing one of a plurality of successive operations on each of a plurality of successive instructions within the pipeline, the successive operations including at least an instruction fetch stage, an operand address stage, an operand fetch stage, an execution stage and a result handling stage. The processor also maintains a plurality of indicators which are selectively updated during the result handling stage for a given instruction to reflect the results obtained during the execution stage thereof. When the second instruction of first and second successively fetched instructions is a conditional transfer, a determination is made as to which indicators may be affected by the execution of the first instruction, and a determination is also made as to which indicator the conditional transfer is to test to decide whether there is a GO or a NOGO condition. If the indicator to be tested by the conditional transfer instruction is among those which may be affected by the immediately preceding instruction, the conditional transfer instruction is held at a predetermined stage, for example, in operand addressing, in the pipeline for a predetermined period, such as one full clock cycle, to permit the indicator to be tested to settle before the conditional transfer instruction tests it.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
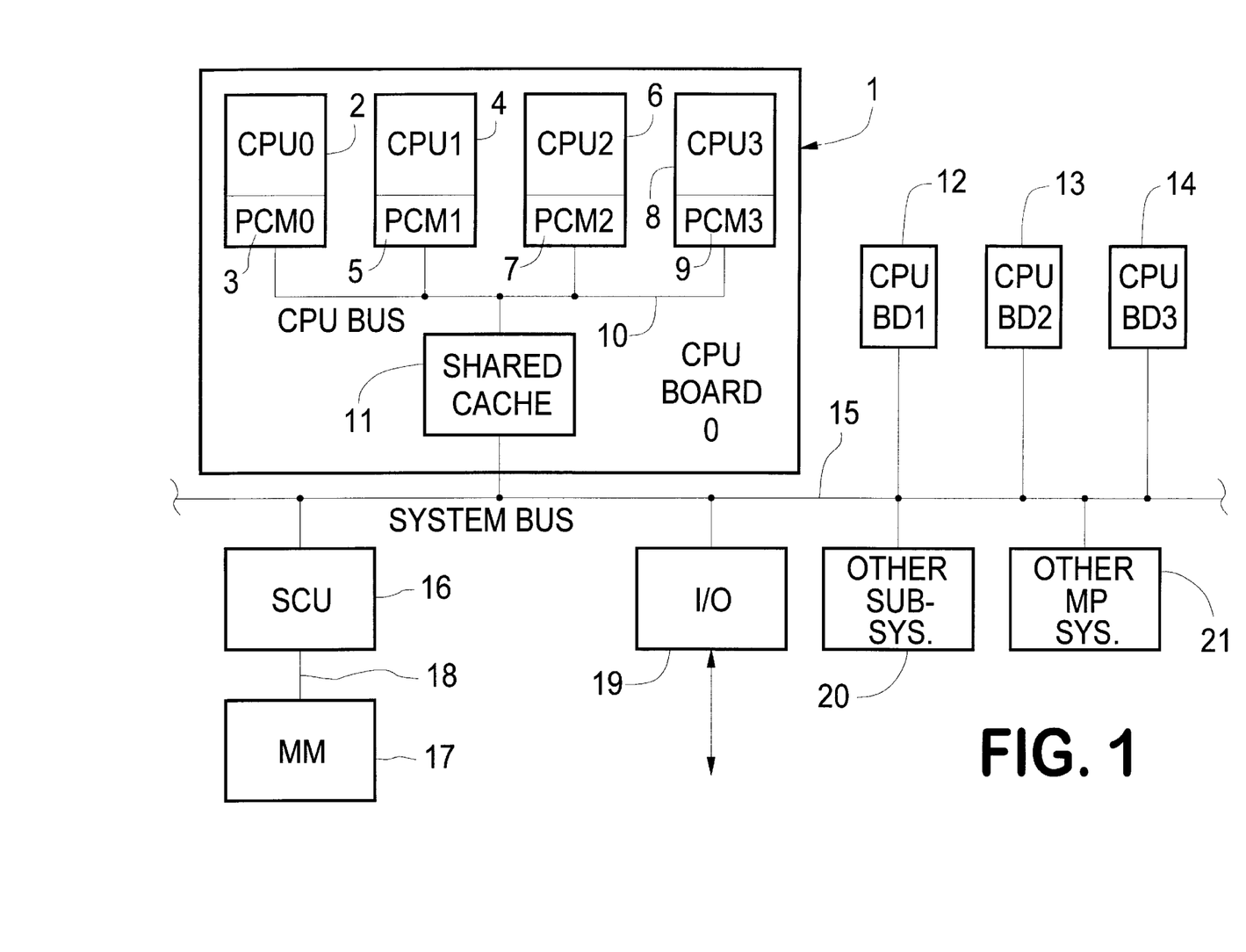
FIG. 1 is a high level block diagram of an multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 17 via a memory bus 18. In addition, one or more input/output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system, and other, complete, multiprocessor systems, represented by the block 21, may also communicate with the multiprocessor system depicted in FIG. 1 via the system bus 15. System control unit 16 also conventionally provides a multi-phase clock to all the system units.

Figure 2:
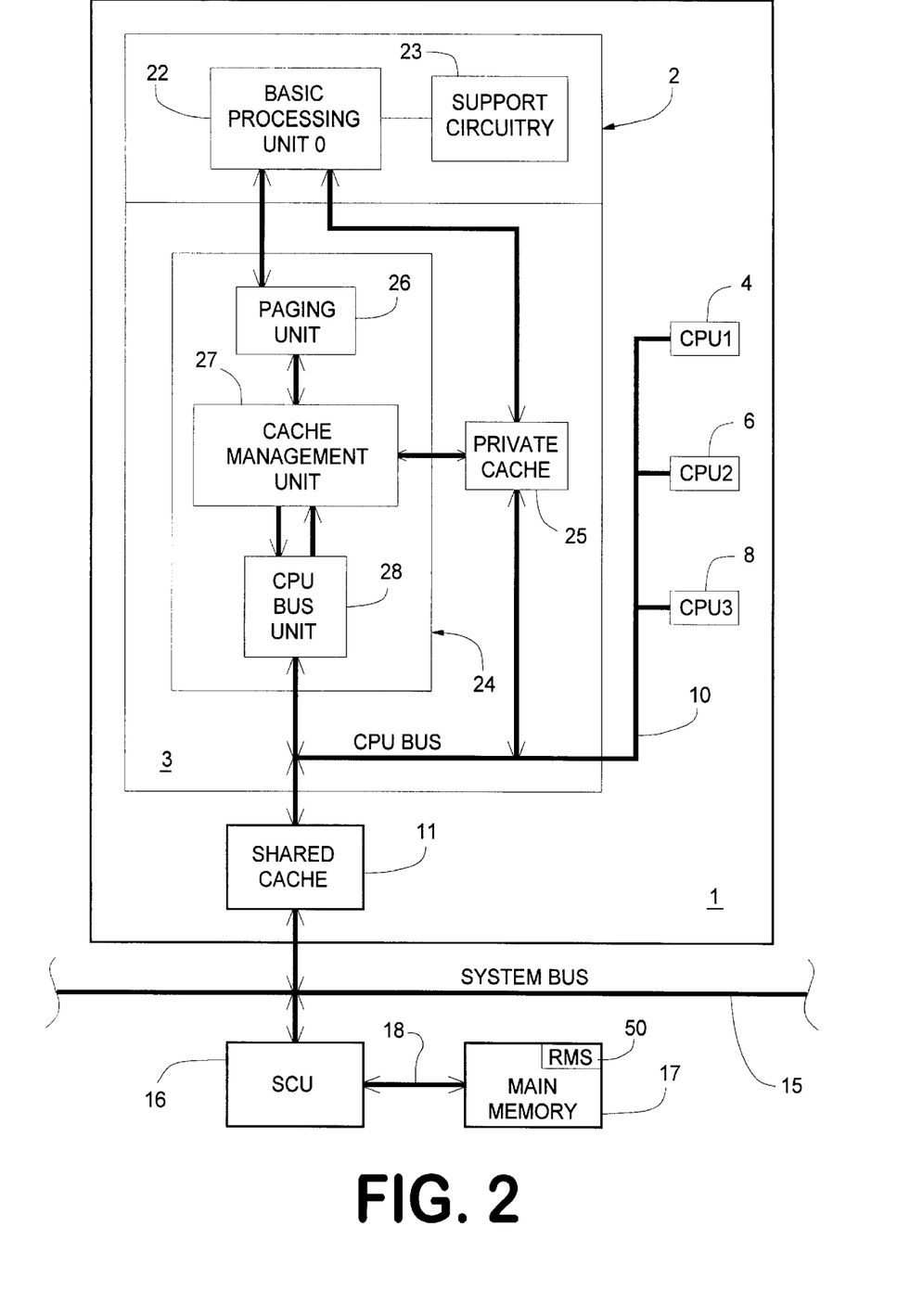
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit (BPU) 22 and BPU control and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit 28 also interfaces with CPU bus 10 and, via CPU bus 10, shared cache 11. Private cache 25 is also coupled directly to receive information from and send information to the CPU bus 10 and to receive information from and send information to BPU "0" 22.

As previously described, shared cache 11 also interfaces with system bus 15 and, via system bus 15, with system control unit 16 and other systems/subsystems shown in FIG. 1. Main memory 17 may be accessed via the system control unit 16 and memory bus 18.

It will be seen that there are numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17 via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Figure 3:
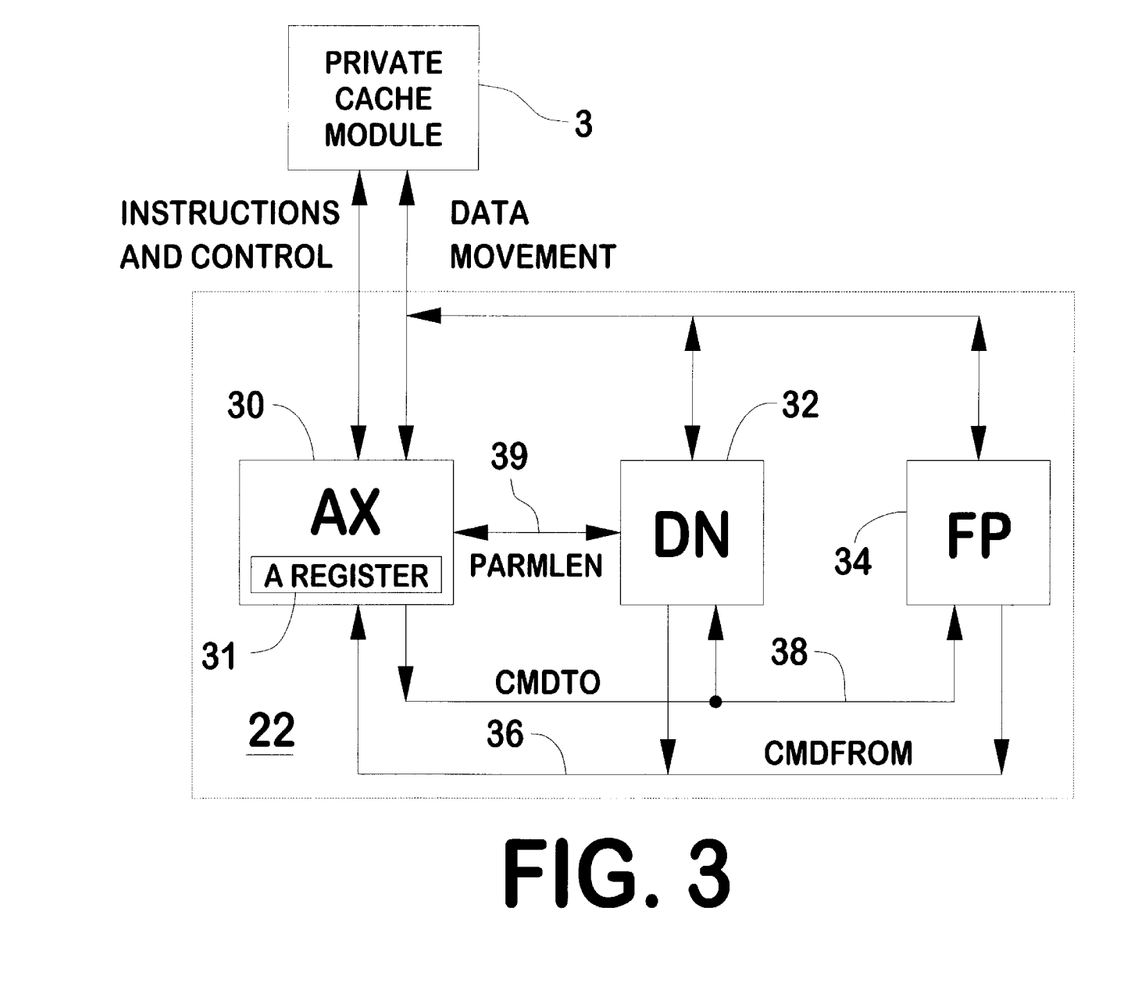
FIG. 3 is a block diagram showing additional details of a basic processing unit (BPU) included within each CPU on the CPU board shown in FIG. 2, each CPU including an address and execution (AX) unit, a decimal numeric (DN) unit, a floating point FP unit and BPU control logic.

FIG. 3 is a block diagram which shows additional details of an exemplary BPU 22 in the CPU 2. An address and execution (AX) unit 30 is a microprocessing engine which performs all address preparation and executes all instructions except decimal arithmetic, binary floating point and multiply/divide instructions. The main functions performed by the AX unit 30, in close alliance with the BPU control logic 23, include:

effective and virtual address formation;
 memory access control;
 security checks;
 register change/use control;
 execution of basic instructions, shift instructions, security instructions, character manipulation and miscellaneous instructions; and
 control and maintenance of a safestore frame used in conjunction with domain changes and error recovery.

Efficient scientific calculation capability is implemented in a floating point (FP) coprocessor unit 34. The FP unit 34 executes all binary floating point arithmetic. This unit, operating in concert with the AX unit 30, performs scalar or vector scientific processing.

The FP unit 34:
 executes all binary and fixed and floating point multiply and divide operations;
 computes 12 by 72-bit partial products in one machine cycle;

computes eight quotient bits per divide cycle;

performs modulo 15 residue integrity checks;

executes all floating point mantissa arithmetic;

executes all exponent operations in either binary or hexadecimal format;

preprocesses operands and post-processes results for multiply and divide instructions; and provides indicator and status control.

A decimal numeric (DN) coprocessor unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A CMDTO ("command to") bus 38 and a CMDFROM ("command from") bus 36 couple together the AX unit 30, the DN unit 32 and the FP unit 34 for certain interrelated operations. A PARMLEN bus 39 communicates parameter length information between the AX unit 30 and the DN unit 32 to specify the effective lengths and scales of operands and results.

The AX unit 30 is a pipelined processor in which the various stages of execution of a series of consecutive machine level instructions are undertaken simultaneously in the well known manner. The AX unit 30 includes, in common with most such processors, an accumulator ("A") register 31.

Figure 4:
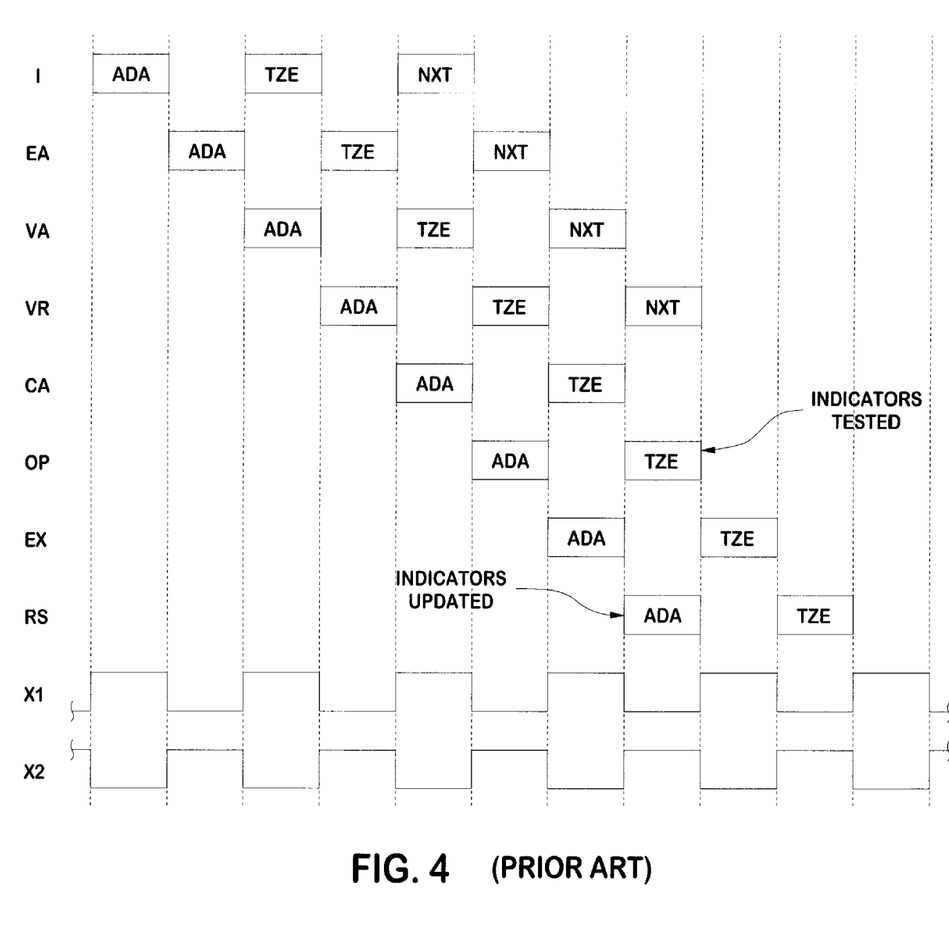
FIG. 4 is a timing diagram showing the relative progress through the pipeline of two exemplary successive instructions in which the results of the first instruction may cause a flag to be set which must be tested by the second instruction.

Referring to FIG. 4, the exemplary AX unit 30 pipeline has eight stages: I (instruction fetch), EA (effective address), VA (virtual address), VR (virtual-to-real address), CA (cache access), OP (operand fetch), EX (execution) and RS (result handling—typically storing the result in the processor's private cache). In the system chosen to illustrate the invention, a two-phase clock (X1, X2) is employed such that the I, VA, CA and EX operations are carried out during X1 while the EA, VR, OP and RS operations are carried out during X2. The EA, VA and VR stages may, in some more simple pipelines, be replaced by a single operand address stage, and, for the purposes of the invention, may be considered as such.

As will be well known to those skilled in the art, a first instruction, the execution of which affects various conditions in the processor, such as the contents of the A register, is often followed by a second instruction which is a conditional transfer (sometimes called conditional branch). The conditional transfer instruction tests one or more indicators which may have been affected by the execution of the first instruction to determine if a conditional transfer ("Go") will be made. In the simple example chosen to illustrate the invention, the first instruction is an ADA which adds the contents of a specified operand stored in the processor's private cache to the current contents of the A register; and the second instruction is a TZE, transfer to a specified instruction stream only if the result of the first instruction leaves the contents of the A register at zero, else execute the next instruction in the current instruction stream. (The next instruction in the pipeline is, for convenience, identified in FIGS. 4 and 5 as "NXT" which does not necessarily specify an actual instruction.)

Thus, according to the prior art, as the ADA instruction passes through the pipeline: it is brought into an instruction register during I; the actual address (usually in the processor's private cache) of a specified operand is determined during EA, VA, VR; the operand is addressed during CA and fetched during OP such that the ADA instruction can be executed during EX with the result processed (typically, saved in the private cache) during RS. In the meantime, the TZE instruction is trailing in the pipeline by one full clock cycle (i.e., X1 to X1 and X2 to X2). According to this prior art pipeline timing, the earliest the indicators, including a result=0 indicator, can be ready for testing is after execution of the ADA instruction has been completed; i.e., during RS. However, the next cycle for the TZE instruction is EX such that the test of the result=0 indicator must have been completed before EX is entered; thus, the test of the result=0 indicator must be carried out during OP (there being no need to fetch an operand) for the TZE instruction. As can be readily understood from FIG. 4, this test must therefore be made during the same X2 period in which the ADA instruction results might cause the result=0 indicator to be updated.

Thus, a potential for a logic race would seem to be present, but, in the past, this has not been a problem because the test could be effectively carried out late in the X2 period (even on the trailing edge of the X2 clock pulse) in order to make the GO/NOGO decision for the TZE conditional transfer during its EX (i.e., during the next X1).

However, as clock speed has been increased in order to improve performance as is now possible because of the availability of faster and more dense logic circuitry, the potential logic race becomes a real logic race such that carrying out the test of an indicator during the same clock pulse phase in which the indicator is updated can no longer be reliably carried out. The undesired results are processor faults causing retries which, even if successful, adversely affect system performance. As the clock rate is further increased, a conditional transfer immediately following in the pipeline an instruction which affects an indicator it must test cannot be performed at all.

Figure 5:
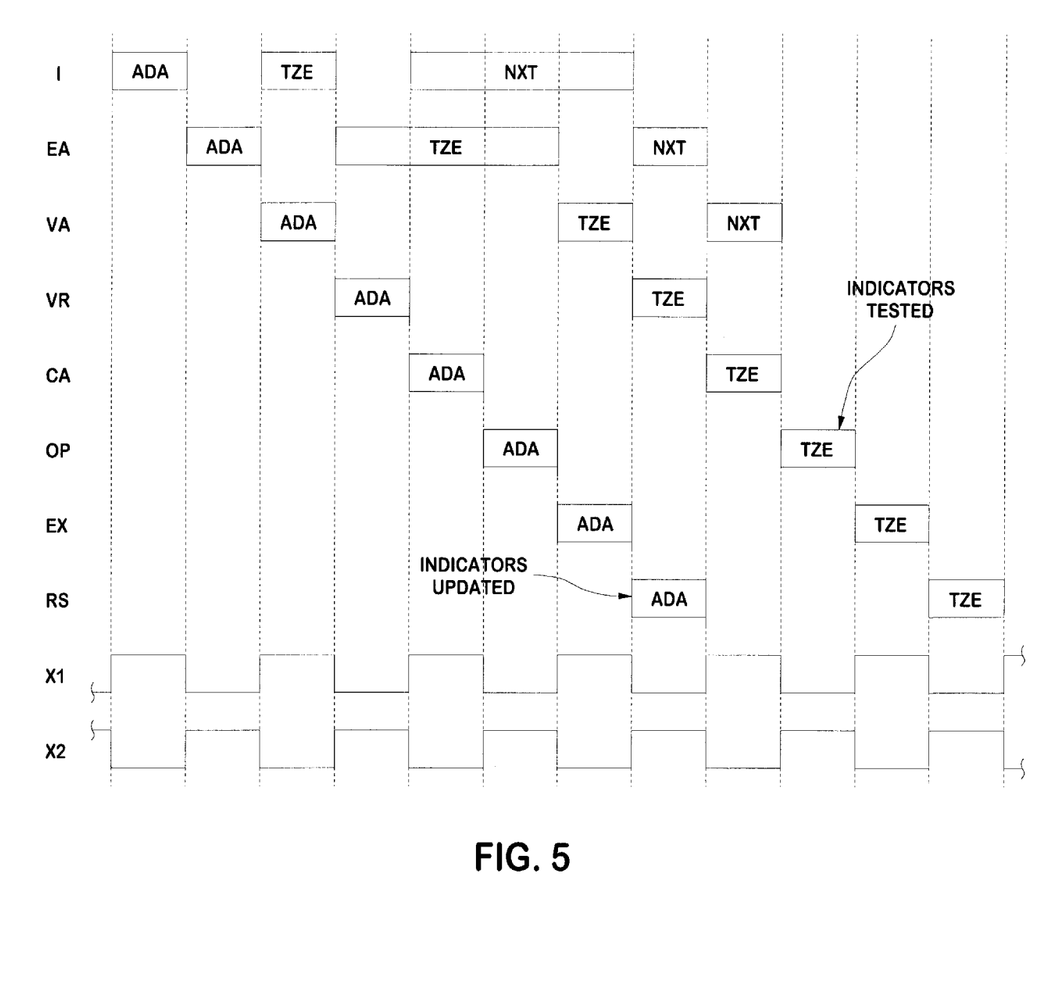
FIG. 5 is a timing diagram similar to FIG. 4, but illustrating the effect of the present invention on the relative timing of the two successive instructions through the pipeline.

Yet, it is neither a suitable remedy to rewrite the software (which may be legacy) to introduce a delay between the two instructions nor to effect a major change to the already highly-developed architecture of the pipeline. However, the present invention avoids such drastic remedies while, at the same time, completely effectively solving this pipeline timing problem. FIG. 5 is a pipeline timing diagram which, like FIG. 4, illustrates the relative pipeline timing of successive ADA and TZE instructions, but taking into account the timing changes brought about by using the present invention.

More particularly, during the I stage for the TZE, the op code of the previous instruction (ADA in the example) is analyzed to determine if it might affect the indicator the TZE must test. An ADA can affect the carry, overflow, sign and zero indicators, so the analysis confirms that the zero indicator may be changed such that the logic race problem occasioned by speeding up the system clock is present. In response, the analysis logic circuitry (or equivalent firmware) holds the TZE command in EA for a full extra clock cycle; i.e., from the beginning of an X2 through the completion of the next X2. Accordingly, by the time the TZE has cycled through the pipeline to the OP stage at which the indicators are tested, the indicator circuitry will have had one complete additional clock cycle to settle after being updated during RS of the ADA instruction such that the uncertainty created by the logic race has been completely eliminated. Similarly, the I stage of the next ("NXT") instruction is also delayed such that this succeeding instruction will logically follow the conditional transfer instruction through the pipeline.

It might be thought that the intentional delay of the conditional transfer instruction's progress (and that of succeeding instructions) through the pipeline according to the principals of the invention would result in a decrease in system performance. However, such a short term decrease in performance is more than compensated for by the increase in clock speed which can be made. That is, a statistical analysis of the frequency of occurrence in an instruction stream including a successive pair of instructions of which the first instruction affects the indicator tested by the second, conditional transfer, instruction fully supports the overall increase in performance effected by increasing the clock rate. Further, even in marginal, cases, retries due to the incipient logic race problem, which adversely affect system performance even if successful, are virtually eliminated by the use of the present invention.

Figure 6:
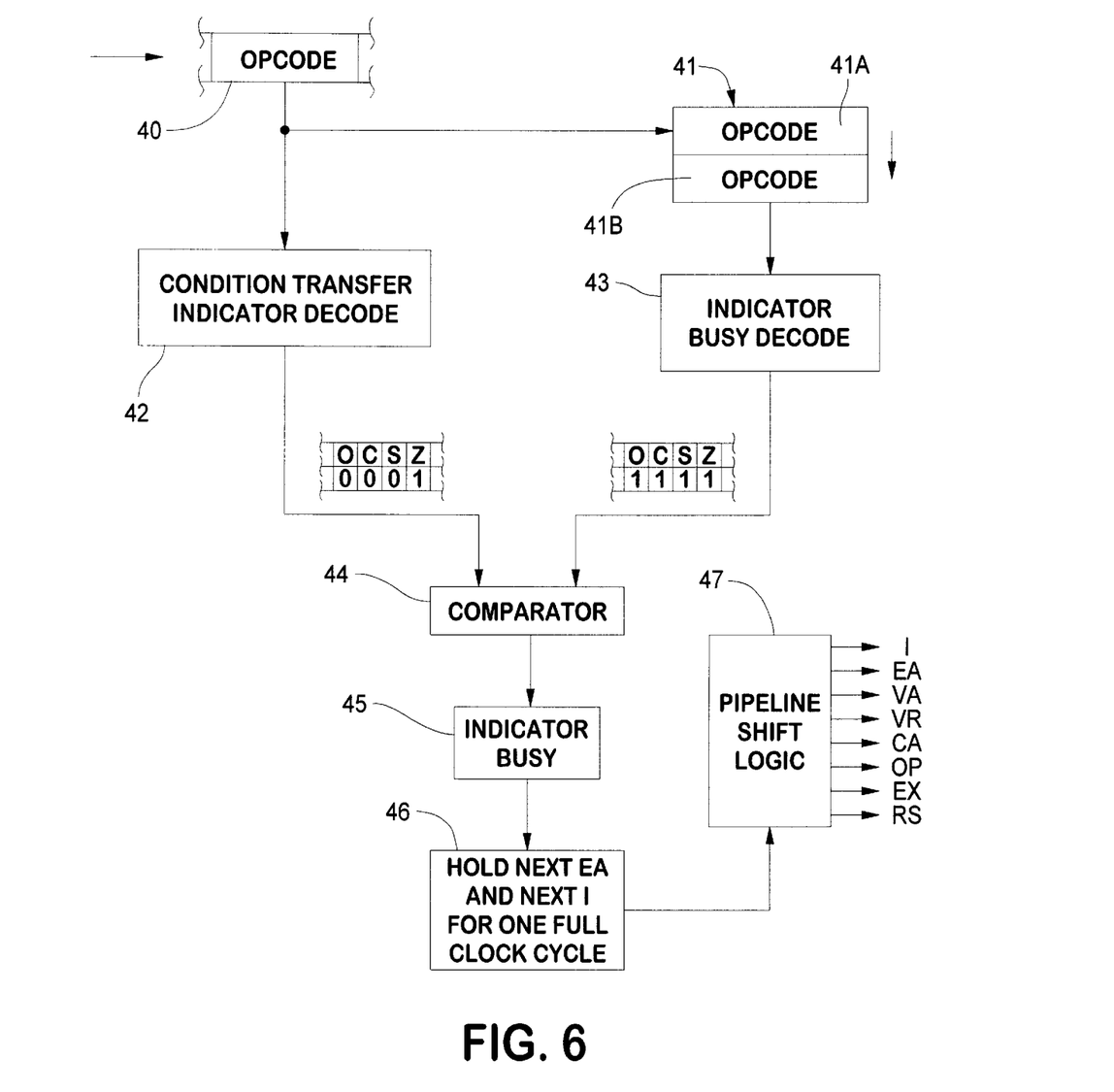
FIG. 6 is a simplified logic diagram illustrating apparatus by which the subject invention may be practiced in an established processor configuration.

Attention in now directed to FIG. 6 which is a simplified logic diagram of a hardware implementation of the invention. The first instruction, ADA in the example, is routinely entered into an instruction register 40 for decoding and to provide other information relevant to its execution such as the identification and storage location of an operand to be employed. In addition, the opcode of the first instruction is saved in a first register 41A of an opcode stack 41. Thus, with respect to the first instruction, the logic shown in FIG. 6 only saves the opcode in the stack 41 during its I stage.

During the succeeding X1, the I stage for the next instruction, TZE in the example, is undertaken. Thus, the TZE instruction is brought into the instruction register 40 for conventional handling, and its opcode is also copied to the top of the opcode stack 41, pushing the opcode for the previous instruction, ADA, down into a second register 41B. Also during I for the TZE instruction, it is identified by condition transfer indictor decode 42 which determines which indicator it is interested in. Thus, from among the overflow, carry, sign and zero indicators, the logic block 42 determines (for example, by a simple table look-up operation or using a decoding logic array) that the conditional transfer instruction (TZE) currently in the instruction register 40 will be testing the zero indicator later in its pipeline cycle.

At the same time, indicator busy decode logic block 43 is performing a similar analysis on the opcode of the ADA instruction which has been pushed down to a second register 41 B in the opcode stack 41. More particularly, indicator busy decode logic block 43 determines that execution of an ADA instruction can modify any of the overflow, carry, sign and zero indicator.

The results obtained by the condition transfer indicator decode logic block 42 and the similar indicator busy decode logic block 43 are compared in a comparator 44 (for example, by straightforward AND-ing in corresponding digit positions), and a determination is made that the instruction ahead of the conditional transfer instruction may cause the indicator of interest (result=0 in the example) to the conditional transfer to be updated. This condition sets an indicator busy flag 45 which, when set, directs logic block 46 to control the pipeline shift logic 47 such that the immediately following EA (i.e., the EA stage for the conditional transfer instruction) is held for one additional full clock cycle and also such that the following I stage (for the "NXT" instruction) is held for one additional full clock cycle. Accordingly, the succeeding pipeline stages for the conditional transfer instruction are postponed as shown in FIG. 5, and the "NXT" instruction is suitably realigned in the pipeline.

While the various logic blocks shown in FIG. 6 represent hardware, those skilled in the art will understand that many, or even all, of their functions can readily be realized by suitably revising the firmware equations controlling the pipeline shift functions. Further, as noted above, a pipeline may have an operand address stage in place of the three address stages, EA, VA and VR, used in the example. Thus, it may be generalized that the hold or delay of the conditional transfer instruction in the pipeline takes place in its operand address stage which may be a single stage or a plurality of sub-stages such as EA, VA and VR as in the example.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a processor including: a pipeline adapted to simultaneously perform one of a plurality of successive operations on each of a plurality of successive instructions within the pipeline, the successive operations including at least an instruction fetch stage, an operand address stage, an operand fetch stage, an execution stage and a result handling stage; and a plurality of indicators, which indicators are selectively updated during the result handling stage for a given instruction to reflect the results obtained during the execution stage of the given instruction; the improvement comprising:
  A) first decode means for determining which indicators may be affected by the execution of the first instruction of first, second and third successively fetched instructions;
  B) second decode means for determining if the second instruction of the first, second and third successively fetched instructions is a conditional transfer instruction which tests an indicator and which indicator it tests;
  C) compare means for determining if the indicator identified by the second decode means matches one of the indicators identified by the first decode means; and
  D) delay means for holding the second instruction and third instruction of the first, second and third successively fetched instructions at a predetermined stage in the pipeline for a predetermined period if the compare means determines that the indicator identified by the second decode means matches one of the indicators identified by the first decode means.

2. The processor of claim 1 which further includes:
  A) an opcode stack for storing the opcodes of at least the first and second instructions of the first, second and third successively fetched instructions; and in which:
  B) the first decode means is coupled to the opcode stack to obtain access to the opcode of the first instruction of the first, second and third successively fetched instructions in order to determine which indicators may be affected by the execution thereof.

3. The processor of claim 1 in which, when the compare means determines that the indicator identified by the second decode means matches one of the indicators identified by the first decode means, the delay means holds:
  A) the second instruction of the first, second and third successively fetched instructions in the operand address stage for the predetermined period; and
  B) the third instruction of the first, second and third successively fetched instructions in the instruction fetch stage for the predetermined period.

4. The processor of claim 2 in which, when the compare means determines that the indicator identified by the second decode means matches one of the indicators identified by the first decode means, the delay means holds:

A) the second instruction of the first, second and third successively fetched instructions in the operand address stage for the predetermined period; and B) the third instruction of the first, second and third successively fetched instructions in the instruction fetch stage for the predetermined period.

5. The processor of claim 1 in which the processor further includes clock means for stepping the pipeline from stage to stage and in which the predetermined period is at least one full clock cycle.

6. The processor of claim 2 in which the processor further includes clock means for stepping the pipeline from stage to stage and in which the predetermined period is at least one full clock cycle.

7. The processor of claim 3 in which the processor further includes clock means for stepping the pipeline from stage to stage and in which the predetermined period is at least one full clock cycle.

8. The processor of claim 4 in which the processor further includes clock means for stepping the pipeline from stage to stage and in which the predetermined period is at least one full clock cycle.

9. A method for controlling a pipeline in a processor, which pipeline is adapted to simultaneously perform one of a plurality of successive operations on each of a plurality of successive instructions within the pipeline, the successive operations including at least an instruction fetch stage, an operand address stage, an operand fetch stage, an execution stage and a result handling stage; which processor maintains a plurality of indicators, which indicators are selectively updated during the result handling stage for a given instruction to reflect the results obtained during the execution stage of the given instruction; the method comprising the steps of:

A) determining which indicators may be affected by the execution of the first instruction of first, second and third successively fetched instructions;

B) determining if the second instruction of the first, second and third successively fetched instructions is a conditional transfer instruction which tests an indicator and which indicator it tests;

C) determining if the indicator to be tested by the second instruction of the first, second and third successively fetched instructions matches one of the indicators which may be affected by the first instruction of the first, second and third successively fetched instructions; and D) if it is determined that the indicator to be tested by the second instruction of the first, second and third successively fetched instructions matches one of the indicators which may be affected by the first instruction of the first, second and third successively fetched instructions, then holding the second instruction and third instruction of the first, second and third successively fetched instructions at a predetermined stage in the pipeline for a predetermined period.

10. The method of claim 9 which further includes the step of:

A) storing the opcodes of at least the first and second successively fetched instructions in an opcode stack; and B) examining the opcode stored in the opcode stack of the first instruction of the first, second and third successively fetched instructions in order to determine which indicators may be affected by the execution thereof.

11. The method of claim 9 in which, when it is determined that the indicator to be tested by the second instruction of the first, second and third successively fetched instructions matches one of the indicators which may be affected by the first instruction of the first, second and third successively fetched instructions, then holding:

A) the second instruction of the first, second and third successively fetched instructions in the operand address stage for the predetermined period; and B) the third instruction of the first, second and third successively fetched instructions in the instruction stage for the predetermined period.

12. The method of claim 10 in which, when it is determined that the indicator to be tested by the second instruction of the first, second and third successively fetched instructions matches one of the indicators which may be affected by the first instruction of the first, second and third successively fetched instructions, then holding:

A) the second instruction of the first, second and third successively fetched instructions in the operand address stage for the predetermined period; and B) the third instruction of the first, second and third successively fetched instructions in the instruction stage for the predetermined period.

13. The method of claim 9 in which the pipeline is stepped from stage to stage by a clock and in which the predetermined period is at least one full clock cycle.

14. The method of claim 10 in which the pipeline is stepped from stage to stage by a clock and in which the predetermined period is at least one full clock cycle.

15. The method of claim 11 in which the pipeline is stepped from stage to stage by a clock and in which the predetermined period is at least one full clock cycle.

16. The method of claim 12 in which the pipeline is stepped from stage to stage by a clock and in which the predetermined period is at least one full clock cycle.

* * * * *